(12) United States Patent
Bloom et al.

(10) Patent No.: US 7,940,449 B2
(45) Date of Patent: May 10, 2011

(54) COMPACT DISPLAY SYSTEM

(75) Inventors: David M Bloom, Jackson, WY (US);
Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 0 days.

(21) Appl. No.: 12/687,306

(22) Filed: Jan. 14, 2010

(65) Prior Publication Data

US 2010/0315694 A1 Dec. 16, 2010

Related U.S. Application Data

(63) Continuation-in-part of application No. 12/482,686, filed on Jun. 11, 2009.

(51) Int. Cl.
*G02F 1/01* (2006.01)
*G02B 26/00* (2006.01)

(52) U.S. Cl. ......... 359/279; 359/238; 359/276; 359/290

(58) Field of Classification Search .................. 359/279, 359/245–246, 254, 259, 264, 247, 263, 278, 359/269, 271, 315–316, 318, 290–291, 230–231, 359/237–238, 240, 267, 298, 649
See application file for complete search history.

(56) References Cited

U.S. PATENT DOCUMENTS

| | | | | |
|---|---|---|---|---|
| 5,231,432 A | * | 7/1993 | Glenn | 353/31 |
| 6,985,294 B1 | * | 1/2006 | Rosenthal et al. | 359/573 |
| 7,549,759 B2 | * | 6/2009 | Bloom | 359/850 |
| 2005/0206909 A1 | * | 9/2005 | Hill | 356/512 |
| 2006/0238851 A1 | * | 10/2006 | Bloom | 359/279 |

OTHER PUBLICATIONS

Jose E. Oti et al., The Optical Differentiation Coronagraph, The Astrophysical Journal, v. 630, p. 631-636, Sep. 1, 2005.
Steven K. Case, Fourier processing in the object plane, Optics Letters, v. 4, p. 286-288, Sep. 1, 1979.
Carole C. Montarou et al., Analysis and design of modified Wollaston prisms, Applied Optics, v. 38, p. 6604-6616, Nov. 1, 1999.
S. Mallick et al., Spatial Differentiation by a Lateral Shear Interferometer, Applied Optics, v. 11, p. 479-480, Feb. 1, 1972.
Lei Wu et al., Analysis of the lateral displacement and the optical path difference in wide-field-of-view polarization interference imaging spectrometer, Optics Communications, v. 273, p. 67-73, 2007.

* cited by examiner

*Primary Examiner* — Dawayne A Pinkney
(74) *Attorney, Agent, or Firm* — NUPAT, LLC; Morrison Ulman

(57) ABSTRACT

A display system is based on a linear array phase modulator and a phase edge discriminator optical system.

11 Claims, 10 Drawing Sheets

(i)

(ii)

COMPACT DISPLAY SYSTEM

RELATED APPLICATIONS

This application is a continuation-in-part of U.S. patent application Ser. No. 12/482,686, filed on Jun. 11, 2009, which is incorporated herein by reference. This application is related to "Structured light system", U.S. patent application Ser. No. 12/687,340, filed on 14 Jan. 2010, and incorporated herein by reference.

TECHNICAL FIELD

The disclosure is generally related to the fields of optical display systems and optical micro-electromechanical systems (MEMS) devices.

BACKGROUND

The ever growing number of smart phones, personal digital assistants and digital cameras has made high resolution image and video capture commonplace. Yet these devices are only able to display their own images and video at a fraction of full resolution. Their display screens simply don't have enough pixels. Thus, the concept of a high resolution projector small enough to be incorporated in handheld devices is appealing and innovation in this area is proceeding at a furious pace.

U.S. patent application Ser. No. 12/482,686 (filed on Jun. 11, 2009, incorporated herein by reference) describes a new high-resolution optical display system based on a MEMS phase modulator and an optical phase discriminator. Many variations of the system are presented including designs incorporating: one or two dimensional phase modulators; polarized or unpolarized light; reflective or transmissive modulators; phase difference or phase similarity discriminators; etc. A unifying theme, however, is that each phase edge—i.e. step increase or step decrease in phase—generated by a phase modulator leads to a pixel in a displayed image. An optical system, including a phase discriminator, performs the translation from phase edges to image pixels.

What is needed is a compact version of the display system that can be fit into personal electronic devices.

DETAILED DESCRIPTION

The compact display system presented here is based on the same physical principles that describe the behavior the display system that is the subject of U.S. patent application Ser. No. 12/482,686 ("Display system"). The construction of the phase discriminator in the compact display system is different, however.

Before describing specific arrangements of optical components it is instructive to revisit the principles laid out in "Display system", and consider them from a slightly different angle. As Feynman once said, "Perhaps a thing is simple if you can describe it fully in several different ways without immediately knowing that you are describing the same thing."

Figure 1:
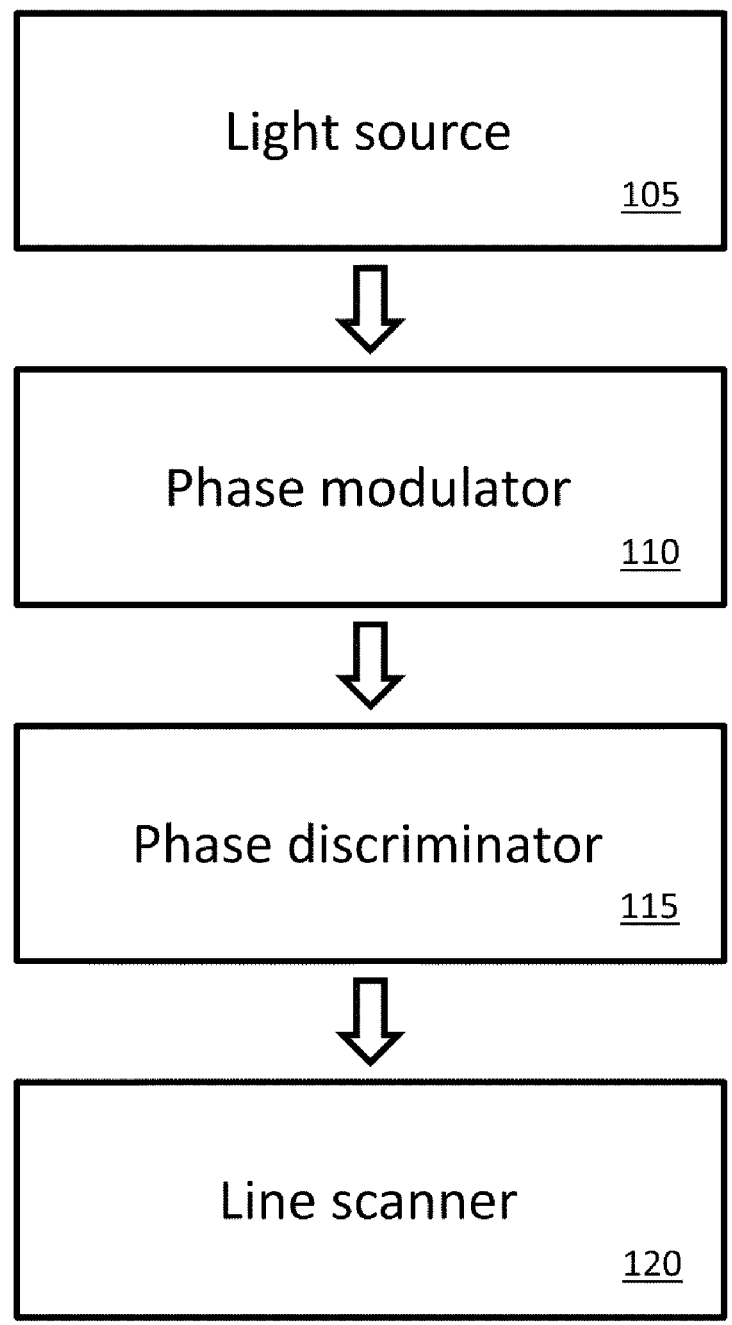
FIG. 1 shows a block diagram of a compact display system.

FIG. 1 shows a block diagram of a compact display system. The system includes light source 105, phase modulator 110, phase discriminator 115, and line scanner 120. Arrows in the figure represent inputs and outputs between the blocks. Light source 105 is a laser, light emitting diode, arc lamp or other bright light source. Phase modulator 110 includes a linear array of elements that change the phase of light. Phase discriminator 115 creates pixels corresponding to phase edges created by the phase modulator. Line scanner 120 "paints" two-dimensional images by scanning a line image back and forth.

The phase discriminator may be modeled as a linear system with an input and an output. The input is provided by the phase modulator which is typically a linear array of MEMS ribbons illuminated by a light source. The array creates an electric field profile which may be represented as $r(x)=e^{j\phi(x)}$, where $\phi(x)$ is the optical phase.

The output of the phase discriminator is a line image that is scanned by a line scanner. The output of the phase discriminator is determined by its impulse response, $h(x)$, convolved with its input, $r(x)$. The problem of designing a phase discriminator is therefore one of determining what impulse response, $h(x)$, is needed and how to build an optical system that has that response. Given an electric field profile input having a single phase step, the desired output is a single-pixel line image.

Let us designate the line image output of the phase discriminator $i(x)$. $i(x)$ may be found by convolution: $i(x)=r(x)*h(x)$; or, using properties of Fourier transforms by: $i(x)=F^{-1}\{R(k)\cdot H(k)\}$. Here $R(k)$ and $H(k)$ are the Fourier transform of $r(x)$ and $h(x)$, respectively (i.e. $R(k)=F\{r(x)\}$). The Fourier transform description is a convenient one as optical fields are transformed according to Fourier transform relationships as they propagate.

Figure 2:
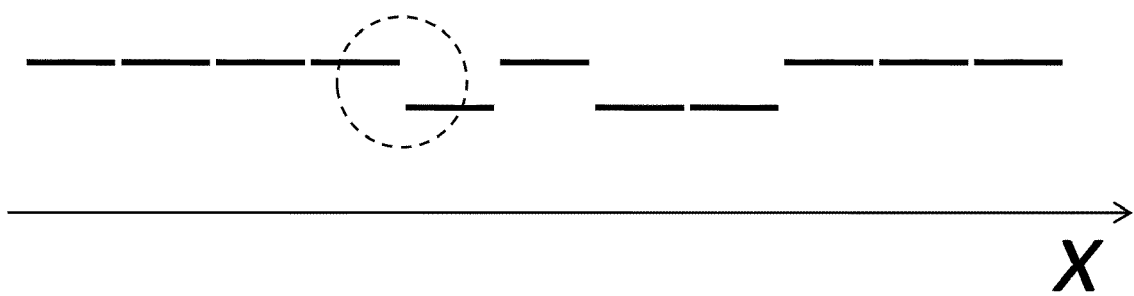
FIG. 2 shows an electric field profile, r(x), and an ideal discriminator function, h(x).
Figure 2:
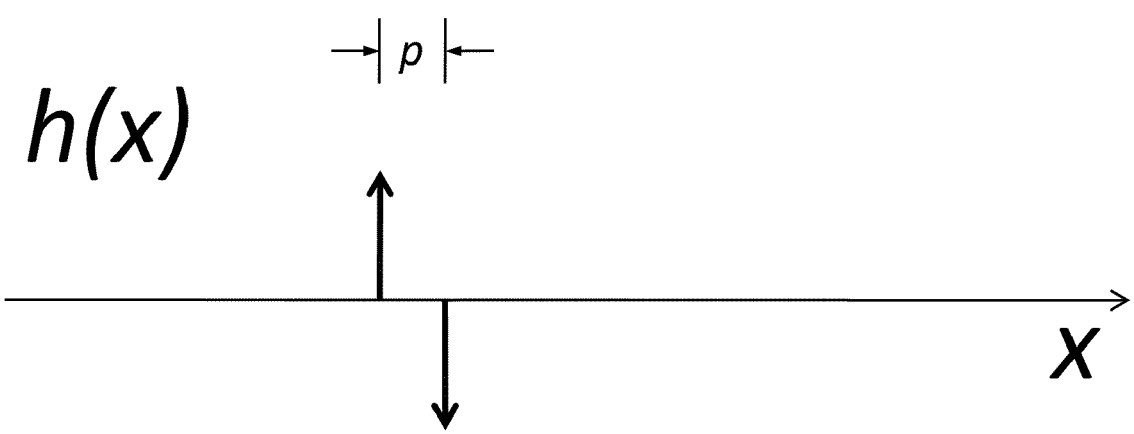

FIG. 2 shows an electric field profile, $r(x)$, and an ideal discriminator function, $h(x)$. ($r(x)$ is a complex valued function; only the real part is shown.) $r(x)$ as shown in the figure may also be thought of conceptually as a diagram of ribbon positions in a linear array ribbon modulator. To simplify discussion, consider only a single field step such as the one inside the dashed circle.

The ideal discriminator impulse response for edge detection is a pair of opposite sign delta functions, $$h(x) = \delta\left(x + \frac{p}{2}\right) - \delta\left(x - \frac{p}{2}\right),$$

as shown in FIG. 2. The delta functions are separated by distance, p, which is the distance between phase edges in $r(x)$. Convolution of close-spaced positive and negative delta functions with a linear array of light modulator elements is equivalent to sampling the differences between phases of light coming from adjacent elements.

Figure 3:
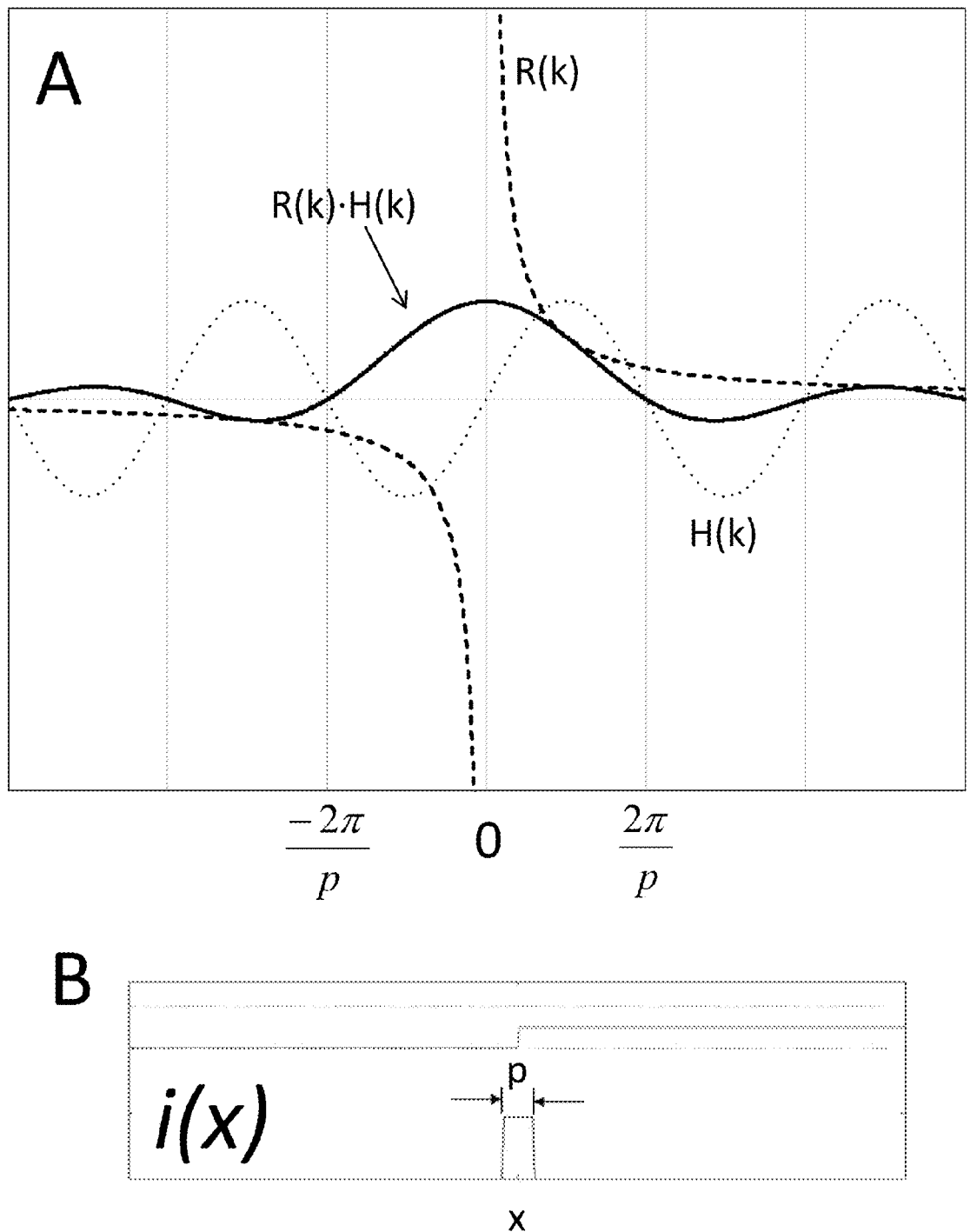
FIG. 3A shows the Fourier transform of an electric field profile, R(k), the Fourier transform of an ideal discriminator function, H(k), and the product of the two, R(k)·H(k).
FIG. 3B shows an ideal system response, i(x).

Fourier transforms may now be used to find the output of the system, i(x). FIG. 3A shows R(k)=F{r(x)}, H(k)=F{h(x)}, and R(k)·H(k); FIG. 3B shows i(x)=F$^{-1}${R(k)·H(k)}. It is instructive to notice that H(k) is a sine function and that R(k)·H(k) is a sinc (i.e. $\sin(\pi x)/(\pi x)$) function. The inverse Fourier transform of a sinc is a pulse as shown in FIG. 3B. The width of the pulse is p.

Figure 4:
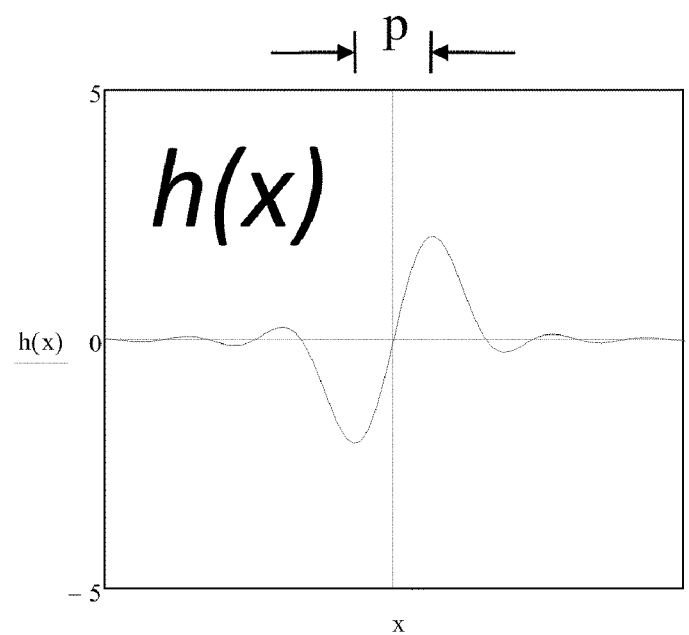
FIG. 4 shows a realistic discriminator function, h(x), and its Fourier transform, H(k).
Figure 4:
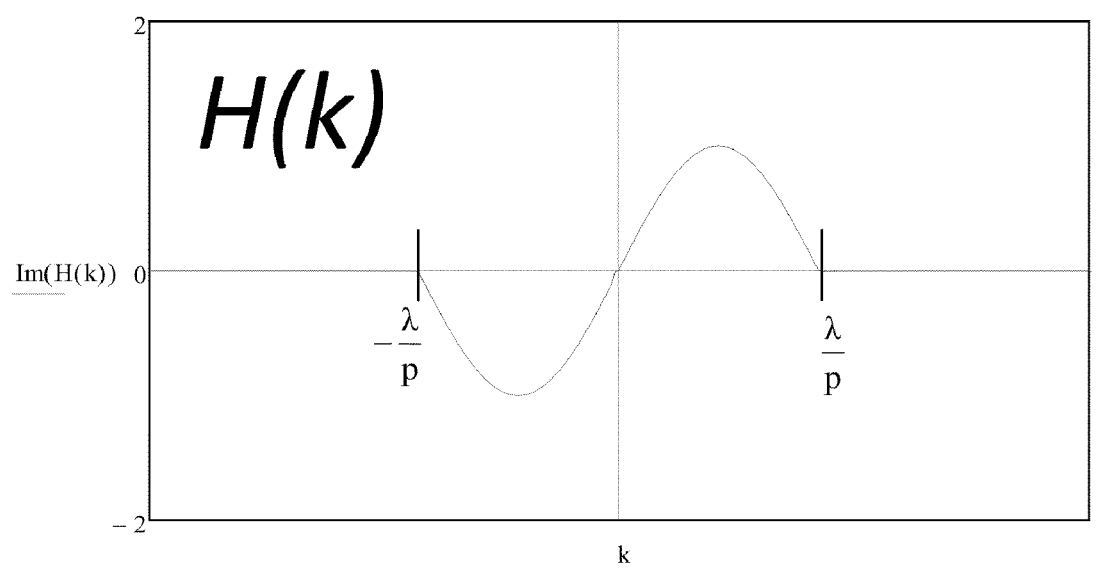
Figure 5:
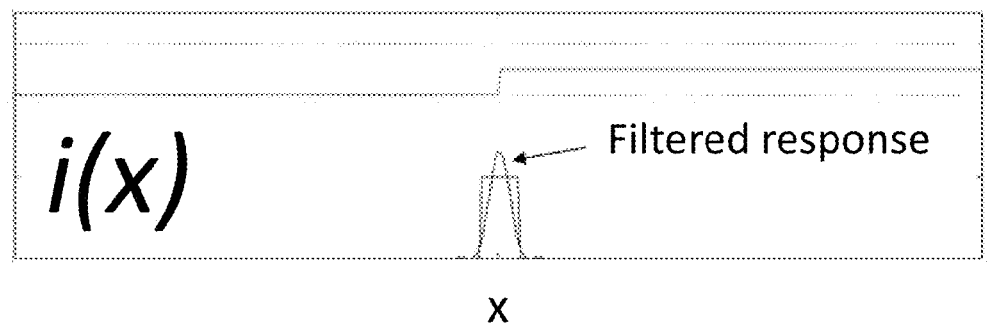
FIG. 5 shows a realistic system response, i(x).

H(k) shows that the ideal phase discriminator function has an angular frequency of p/2. However a real optical system cannot pass light from all angles. Therefore consider the effect of cutting off the discriminator function for angles greater than $\lambda/p$ where $\lambda$ is the wavelength of light. FIG. 4 shows a realistic discriminator function, h(x), and its Fourier transform, H(k), which obeys the constraint: H(k)=0 if $|k|>\lambda/p$. This leads to an impulse response h(x) of the form sinc(x−p/2)−sinc(x+p/2), essentially a broadened version of the delta function version of h(x) presented above. The output in this case i(x)=F$^{-1}${R(k)·H(k)} is shown in FIG. 5 where R(k) is the same as before. i(x) now has a Gaussian-like (labeled "Filtered response"), rather than rectangular, shape.

Figure 6:
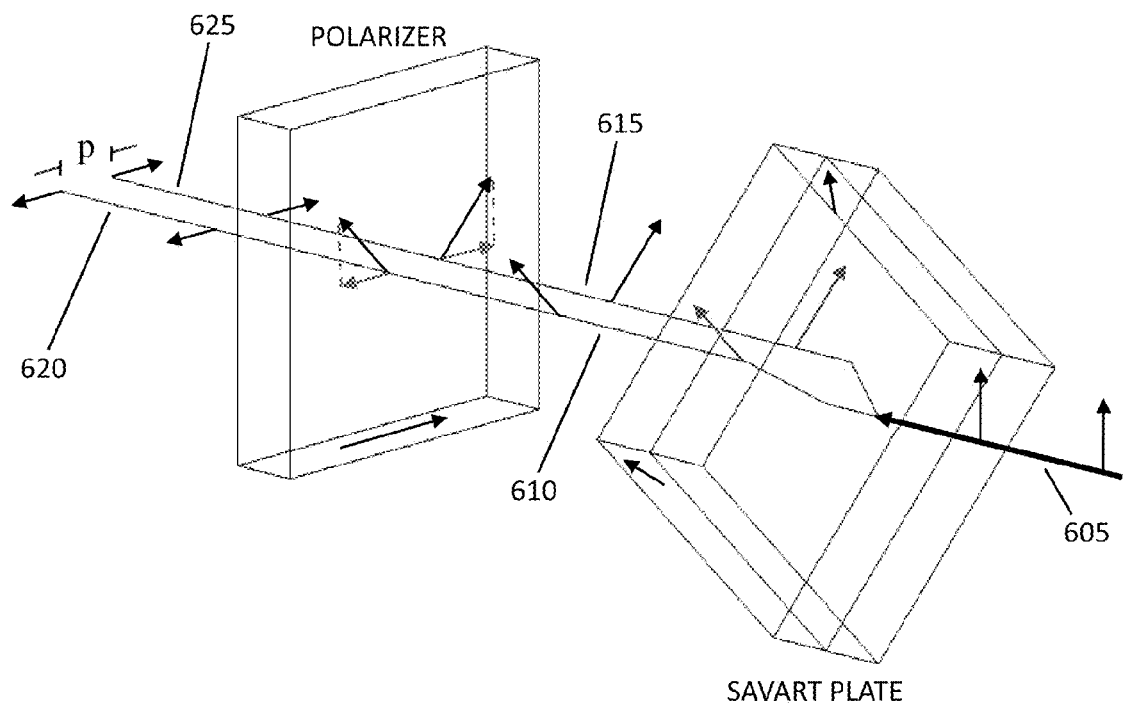
FIG. 6 shows some of the components of an optical phase step discriminator.

Given the desired phase discriminator impulse response one may now set about the task of implementing it in an optical system. For a system using polarized light, a discriminator may be based on a Savart plate and polarizers. FIG. 6 shows some of the components of such an optical phase step discriminator.

A Savart plate is constructed from two birefringent plates with optical axes oriented 45° to the surface normal and rotated 90° with respect to each other. An incident light beam 605 propagating through the first plate is resolved into ordinary and extraordinary beams which are displaced from each other. Upon entering the second plate, the ordinary beam becomes an extraordinary beam, and vice-versa. Two beams (610 and 615) emerge from the Savart plate displaced along a diagonal by a distance, "p". (This distance may be matched to ribbon pitch by selecting appropriate birefringence and thickness of Savart plate materials.) The optical path difference between the two beams is zero for normal incidence. A polarizer (oriented perpendicular to the polarization of input beam 605) selects polarization components of beams 610 and 615. Finally, beams 620 and 625 have the same polarization, propagate parallel to one another a distance p apart, and are out of phase by $\pi$. Thus their combined transverse profile is a close approximation to the function h(x) of FIG. 2.

Figure 7:
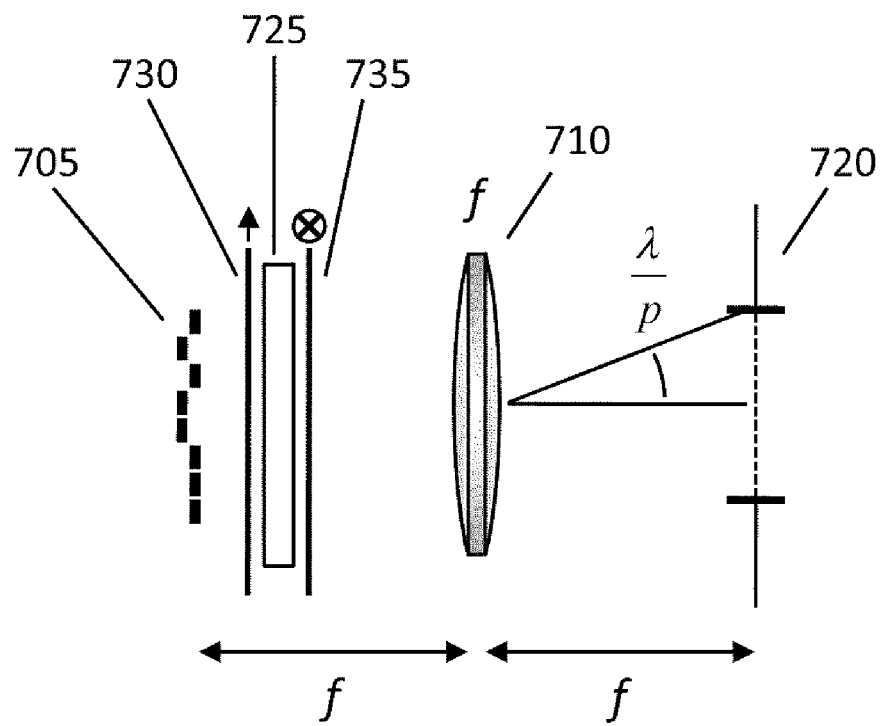
FIG. 7 shows components of an optical display system.

FIG. 7 shows components of an optical display system. In FIG. 7, line segments 705 represent elements of a linear array optical phase modulator. Lens 710 is placed one focal length away from, and between, the phase modulator elements and Fourier plane 720. Savart plate 725 is placed between lens 710 and phase modulator elements 705. The Savart plate is sandwiched by polarizers 730 and 735. In FIG. 7 polarizers 730 and 735 are illustrated with crossed polarization axes.

In FIG. 7 the acceptance angle of the optical system is shown cut off at an angle of $\lambda/p$ illustrating the effect of a finite aperture. The effect of this aperture is to broaden the ideal impulse response, h(x), of the phase discriminator from its ideal form of FIG. 2 to the form shown in FIG. 4.

It is shown in "Display system" that many implementations of an optical phase discriminator are possible. Systems may be designed to use polarized or unpolarized light. Discriminators may be made to maximize their response to differences or similarities in the phase of light coming from adjacent modulator elements. Phase discrimination may be performed by optics operating in the object plane or Fourier plane of an optical system. Some examples are:

|  | Object plane | Fourier plane |
|---|---|---|
| Polarized | Savart plate + polarizers | Wollaston prism + polarizers |
| Unpolarized | Thick hologram | Apodizing filter |

Figure 8:
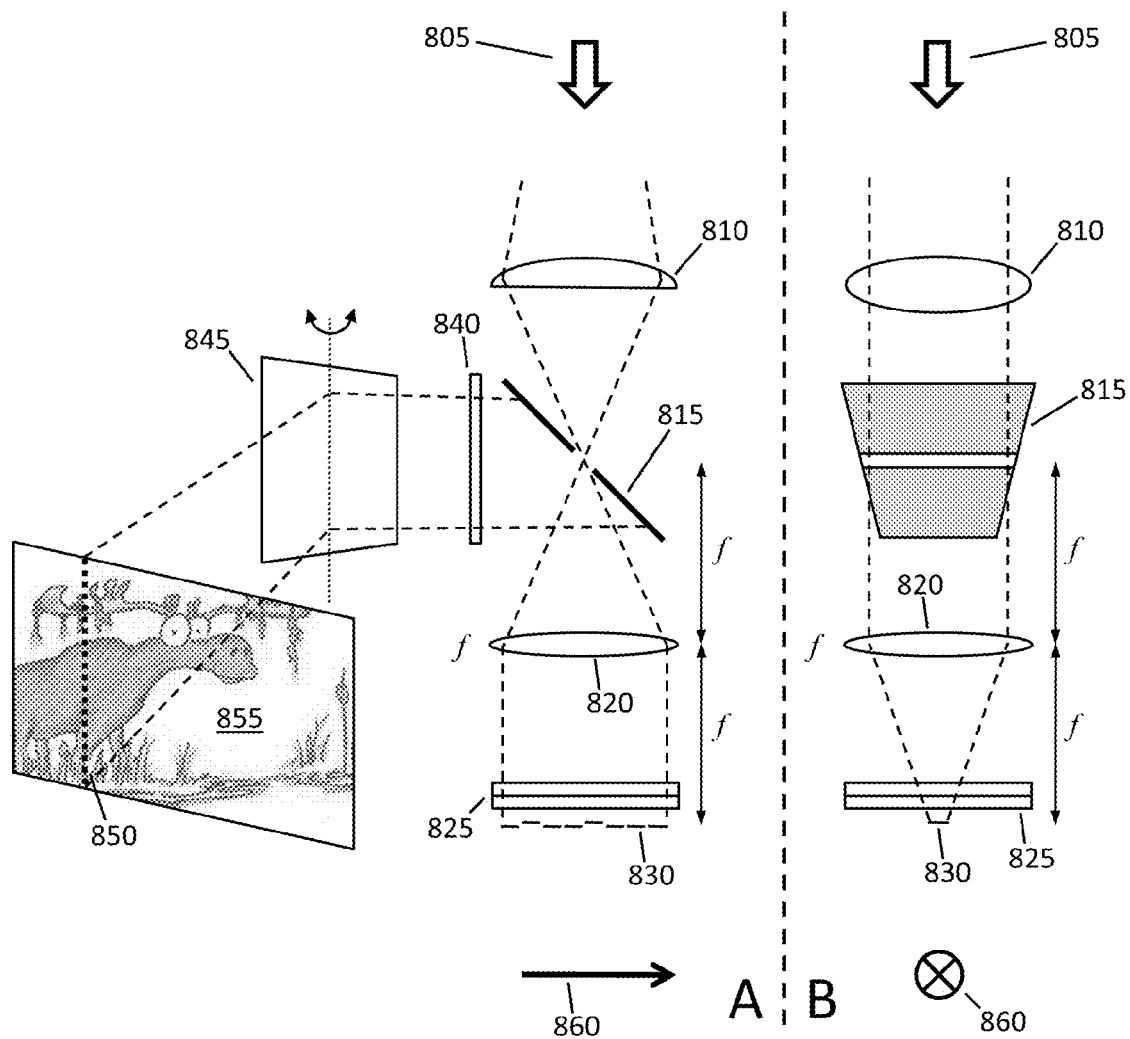
FIG. 8 shows components of a compact optical display system.

Each of these variations is also applicable to the compact display system described here, and the compact display system itself may be implemented in several complementary versions. FIG. 8 shows components of a compact optical display system.

The system of FIG. 8 uses a mirror having a thin slit. The slit passes light (from a laser or other light source) to illuminate a phase modulator while reflecting light that has been transformed into a line image. The line image is scanned to form a two-dimensional image.

FIG. 8 shows two views, labeled "A" and "B", of the same system. Not all of the components appearing in view A appear in view B. View B shows components illustrated in view A as they would appear if viewed in the plane of the paper in the direction indicated by arrow 860.

We will refer to light source 805 as a laser; however, other bright light sources are also acceptable. Light from laser 805 is focused in the plane of view A by cylindrical lens 810. In the plane of view B lens 805 collimates the light. The light then passes through a slit in mirror 815 before arriving at lens 820. The light then passes through Savart plate 825 before arriving at phase modulator elements 830. In view A phase modulator elements 830 are seen to form a linear array; in view B the array is seen end-on so only one element is visible. View A shows just a few modulator elements; an actual modulator may have several thousand elements. The ribbons of a reflective MEMS ribbon based phase modulator are an example of phase modulator elements 830.

After light is reflected from phase modulator elements 830 it then passes through Savart plate 825 and lens 820 before being reflected by mirror 815. The light then passes through polarizer 840 (oriented perpendicular to the polarization of light from laser 805) before being reflected by scan mirror 845. Line image 850 is scanned by scan mirror 845 to form two-dimensional image 855. Items 840, 845, 850 and 855 appear in view A only. In view B mirror 815 is drawn in approximate perspective.

In FIG. 8 mirror 815 is uniformly reflective. However, an alternate compact display system may be constructed by making the following modifications to the system of FIG. 8: remove Savart plate 825 and polarizer 840; modify the reflection coefficient of mirror 815 according to FIG. 9, graph (ii).

Figure 9:
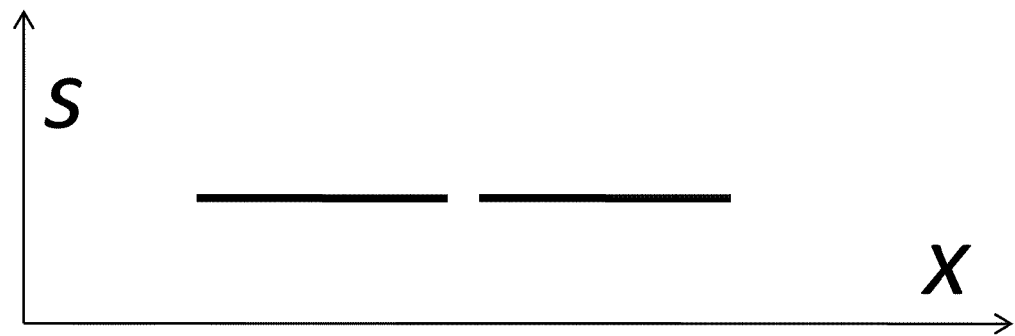
FIG. 9 shows various reflection coefficient profiles.
Figure 9:
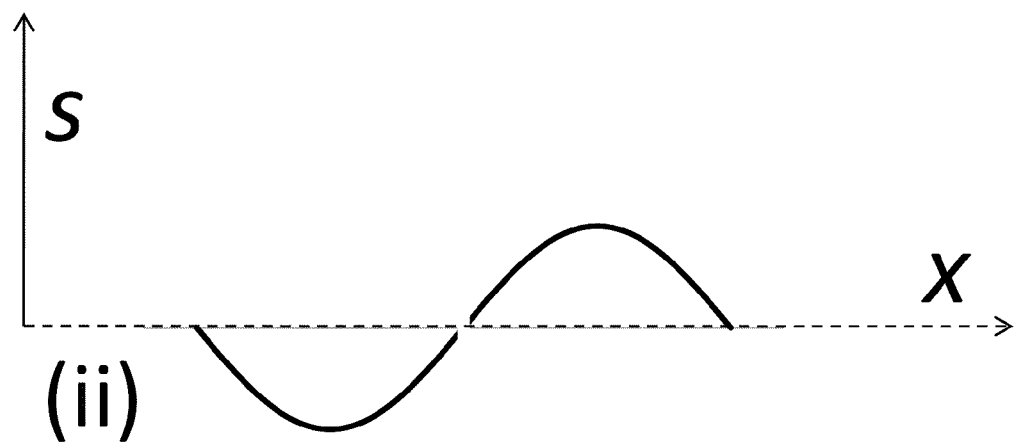

FIG. 9 shows a various reflection coefficient profiles. Profile (i) shows the uniform reflection coefficient, s, of mirror 815 and its slit. Profile (ii) shows a sinusoidal reflection coefficient with a slit. Profile (ii) may be obtained in practice by coating mirror 815 to have a reflectivity that is the square of the reflection coefficient shown and including a $\pi$ phase shift on one half of the mirror (by adding an extra thickness of glass, for example). We refer to such a mirror as having a single-period, sinusoidal reflection coefficient.

In the system of FIG. 8, modified as just described, mirror 815 now acts as an apodizing filter in the Fourier plane; it is a phase discriminator with an angular frequency of p/2, cut off at angles greater than $\lambda/p$. Thus the phase discrimination effect of the modified system is the same as that of the original. The modified system does not rely on polarized light, however. All of the variations mentioned above and in "Display system" apply to this system as well. For example, it may be arranged to discriminate for phase similarities, rather than phase differences, by rotating polarizer 840 or using a cosine reflection coefficient apodizing filter. The compact system has still another variation, however.

Figure 10:
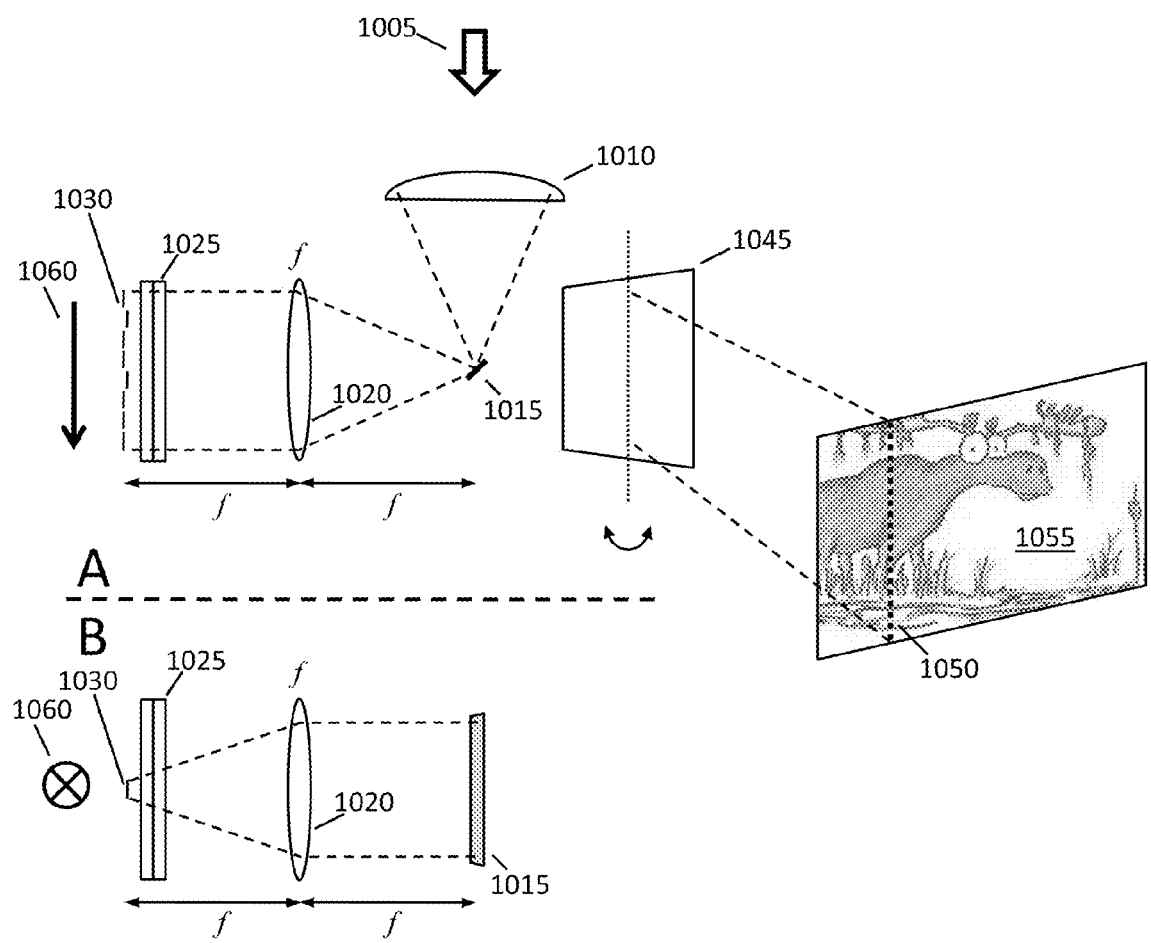
FIG. 10 shows components of a compact optical display system.

FIG. 10 shows components of a compact optical display system. This time a thin, slit-shaped mirror replaces mirror 815. A "thin, slit-shaped mirror" is one having a rectangular reflective area with an aspect ratio (the ratio of length to width) of at least ten to one. Note that such a mirror can be formed by a thin reflective strip on a transparent substrate. The thin, slit-shaped mirror reflects light focused on it to illuminate a phase modulator while passing light that has been transformed into a line image. The line image is scanned to form a two-dimensional image.

FIG. 10 shows two views, labeled "A" and "B", of the same system. Not all of the components appearing in view A appear in view B. View B shows components illustrated in view A as they would appear if viewed in the plane of the paper in the direction indicated by arrow 1060.

We will refer to light source 1005 as a laser; however, other bright light sources are also acceptable. Light from laser 1005 is focused in the plane of view A by cylindrical lens 1010. In the plane of view B lens 1005 collimates the light. The light is then reflected by thin, slit-shaped mirror 1015 before arriving at lens 1020. The light then passes through Savart plate 1025 before arriving at phase modulator elements 1030. In view A phase modulator elements 1030 are seen to form a linear array; in view B the array is seen end-on so only one element is visible. View A shows just a few modulator elements; an actual modulator may have several thousand elements. The ribbons of a reflective MEMS ribbon based phase modulator are an example of phase modulator elements 1030.

After light is reflected from phase modulator elements 1030 it then passes through Savart plate 1025 and lens 1020 before being reflected by scan mirror 1045. Line image 1050 is scanned by scan mirror 1045 to form two-dimensional image 1055. Items 1005, 1010, 1045, 1050, and 1055 appear in view A only. Additionally a polarizer (oriented perpendicular to the polarization of light from laser 1005) is placed before scan mirror 1045 in analogy to polarizer 840 (not shown).

An alternate compact display system may be constructed by making the following modifications to the system of FIG. 10: remove Savart plate 1025 and all polarizers; modify the slit-shaped mirror 1015 my mounting it on an apodizing substrate having transmittance amplitude of the form of profile of FIG. 9, graph (ii).

FIG. 9 shows various profiles. For an alternate version of the display system of FIG. 10, profile (ii) may be used as the transmittance amplitude of an apodizing substrate upon which a high-reflectivity, slit-shaped mirror is formed. Profile (ii) may be obtained in practice by coating a substrate to have a transmittance that is the square of the transmittance amplitude shown and including a π phase shift on one half of the substrate (by adding an extra thickness of glass, for example). We refer to such a substrate as having a single-period, sinusoidal transmission coefficient.

In the system of FIG. 10, modified as just described, the substrate upon which mirror 1015 is mounted acts as an apodizing filter in the Fourier plane; it is a phase discriminator with an angular frequency of p/2, cut off at angles greater than λ/p. Thus the phase discrimination effect of the modified system is the same as that of the original. The modified system does not rely on polarized light, however. All of the variations mentioned above and in "Display system" apply to this system as well. For example, it may be arranged to discriminate for phase similarities, rather than phase differences, by rotating a polarizer or using a cosine transmission coefficient apodizing filter.

A compact display system is based on an optical phase discriminator that converts a phase profile presented by a linear array phase modulator into an intensity profile forming a line image. In a compact system, a mirror having a thin slit (or, in an alternate embodiment, a thin, slit-shaped mirror) acts as a very efficient beam splitter to separate light propagating toward and away from a phase modulator. The small slice of light that the slit (or slit-shaped mirror) removes from the angular response of the phase discriminator system makes only an imperceptible difference in the pixel response of display.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A display comprising:
    a light source;
    a phase modulator comprising a linear array of elements that modulate the phase of light generated by the light source;
    an optical phase discriminator that converts phase differences between light from adjacent modulator elements into pixels of a line image; and,
    a scanner that scans the line image to create a two-dimensional image;
    wherein,
    the phase discriminator comprises a mirror having a slit such that light from the light source passes through the slit before illuminating the phase modulator and light from the modulator is reflected by the mirror before being scanned by the scanner.

2. The display of claim 1 wherein the light source is a laser.

3. The display of claim 1 wherein the elements of the phase modulator are micro-electromechanical ribbons.

4. The display of claim 1 wherein the phase discriminator comprises a Savart plate.

5. The display of claim 1 wherein the mirror has a single-period, sinusoidal reflection coefficient.

6. A display comprising:

a light source;

a phase modulator comprising a linear array of elements that modulate the phase of light generated by the light source;

an optical phase discriminator that converts phase differences between light from adjacent modulator elements into pixels of a line image; and, a scanner that scans the line image to create a two-dimensional image;

wherein, the phase discriminator comprises a slit-shaped mirror such that light from the light source is reflected by the mirror before illuminating the phase modulator and light from the modulator passes around the mirror before being scanned by the scanner.

7. The display of claim 6 wherein the light source is a laser.

8. The display of claim 6 wherein the elements of the phase modulator are micro-electromechanical ribbons.

9. The display of claim 6 wherein the phase discriminator comprises a Savart plate.

10. The display of claim 6 wherein the slit-shaped mirror is a rectangular reflective area with an aspect ratio of at least ten to one on a transparent substrate.

11. The display of claim 10 wherein the substrate has a single-period, sinusoidal transmission coefficient.

* * * * *